United States Patent
Yoshikawa et al.

(10) Patent No.: US 6,542,552 B1
(45) Date of Patent: Apr. 1, 2003

(54) DATA TRANSMITTER

(75) Inventors: Takefumi Yoshikawa, Osaka (JP); Yutaka Terada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/468,830

(22) Filed: Dec. 22, 1999

(30) Foreign Application Priority Data

Dec. 24, 1998 (JP) ............................................ 10-366806

(51) Int. Cl.[7] .............................. H03B 3/00; G06F 1/12
(52) U.S. Cl. ........................ 375/257; 375/360; 713/400
(58) Field of Search ................................ 375/219, 222, 375/257, 356, 360, 377; 326/30; 713/400, 503

(56) References Cited

U.S. PATENT DOCUMENTS 5,050,194 A  * 9/1991 Pickering et al. ........... 375/357
5,845,108 A    12/1998 Yoo et al.
6,177,807 B1 * 1/2001 Bertin et al. ................... 326/30
6,317,842 B1 * 11/2001 Nguyen ....................... 713/400
6,438,703 B1 * 8/2002 Berning et al. ............. 713/401

* cited by examiner

*Primary Examiner*—Young T. Tse
(74) *Attorney, Agent, or Firm*—McDermott, Will & Emery

(57) ABSTRACT

A data transmitter according to the present invention includes driver, transmission line and receiver. The receiver includes a transition pulse generator for generating a transition pulse simultaneously with the transition of a data signal output from the driver. If an edge of an internal clock signal overlaps with the transition pulse being applied, then the receiver does not latch the data signal in synchronism with the edge of the internal clock signal. Instead, the receiver obtains and retains a data value opposite to the previous cycle one. On the other hand, while no transition pulses are being applied, the receiver latches the data signal normally responsive to the internal clock signal. Accordingly, the receiver can always accurately retain the very data transmitted through the transmission line, thus improving the reliability of the data received and realizing high-speed data transmission even if the internal clock signal has lagged with respect to the data signal.

5 Claims, 17 Drawing Sheets

DATA TRANSMITTER

BACKGROUND OF THE INVENTION

The present invention relates to an improved data transmitter for transmitting digital data from a driver to a receiver.

In recent years, a "DS-Link" technique has been adopted to transmit data from a driver to a receiver as in the IEEE 1394 standards. According to the DS-Link technique, data is transmitted using two types of signals: data signal and strobe signal. Specifically, if the data changes its value every time like 0, 1, 0, 1, . . . , then the strobe signal remains the same. Alternatively, if the same data value of 0 or 1 appears consecutively, then the strobe signal changes its level. An exclusive-OR is obtained based on the level transitions of these two types of signals, thereby reproducing desired data.

According to the DS-Link technique, either the data or strobe signal changes its level during one transmission period (or one cycle) of data. Thus, compared to a method of transmitting data that has been latched in synchronism with every edge of a clock signal, a much greater margin should be ensured in view of skewing between a clock signal and the data to be transmitted.

However, as the data transmission rate has reached the order of several gigabits, one cycle time of data is now less than 1 ns. If data is transmitted at such a high speed, then the DS-Link technique is no longer applicable to reproduction of desired data because of the following reasons. Specifically, the shorter one cycle time of data is, the larger percentage of the cycle time the output timing lag or propagation time lag between the data and strobe signals accounts for at the driver or on the transmission line. In such a situation, an edge of the data signal output comes too close to an associated edge of the strobe signal output. As a result, the receiver can obtain no exclusive-OR for these two types of signals anymore.

Nevertheless, if only data is output from the driver without adopting the DS-Link technique (i.e., with no strobe signal output), then the receiver should latch the data in synchronism with an internal clock signal. In such a situation, a skewing problem of a different type happens between the data and internal clock signals this time.

SUMMARY OF THE INVENTION

An object of the present invention is transmitting accurate data from a driver to a receiver at high speeds by outputting only the data from the driver without outputting any strobe signal and by getting the data latched by the receiver in synchronism with an internal clock signal. For that purpose, the skew between the data and internal clock signals is eliminated or at least greatly reduced according to the present invention.

Another object of the present invention is getting accurate data latched by the receiver even if the internal clock signal has delayed with respect to the data.

To achieve this object, if data in transition should be latched (i.e., if erroneous data is possibly latched), then the data is latched in a different way from the ordinary one (i.e., in synchronism with the internal clock signal). The "level transition" of data generally means that the data value changes from one value (before the transition) into the other (after the transition). Thus, when such data in transition should be latched, data with a value opposite to the previous one is latched according to the present invention.

A data transmitter according to the present invention includes: a driver for outputting digital data onto a transmission line; and a receiver for latching the data, which has been output on the transmission line, in synchronism with an edge of an internal clock signal. The receiver includes: a transition pulse generator for generating transition pulses, each representing a transition of the data that has been output on the transmission line; and a data latching circuit for latching data with a value opposite to that of another data that has been output on the transmission line during a previous cycle if any edge of the internal clock signal at the receiver overlaps with associated one of the transition pulses.

In one embodiment of the present invention, the receiver may include means for controlling the phase of the internal clock signal. The phase control means adjusts the period of the internal clock signal by comparing an edge of the data that has been output onto the transmission line to an associated edge of the internal clock signal.

In this particular embodiment, the phase control means preferably operates while each said transition pulse is being applied from the transition pulse generator.

In an alternate embodiment, the driver may include a clock signal transmitter for transmitting a periodic clock signal defining the period of the data that will be output onto the transmission line. The receiver may include an internal clock generator for generating the internal clock signal of the receiver responsive to the periodic clock signal received from the clock signal transmitter.

In another embodiment of the present invention, the data transmitter may further include additional transmission lines. The driver may include a marker for placing a reference mark at an appropriate location of each of a series of data items that will be output onto the transmission lines. The receiver may include: a plurality of FIFO memories for storing the series of data items that have been output on the transmission lines; and a sorter for receiving the reference marks from the marker and sorting out the series of data items that have been received at the FIFO memories based on the reference marks.

In the data transmitter according to the present invention, the transition pulse generator generates the transition pulse in each transition period of the data, during which erroneous data might be latched on an associated edge of the clock signal. If the internal clock signal rises at an edge overlapping with the period during which the transition pulse is being applied, then the data is not latched in synchronism with the clock signal. Instead, the data latching circuit latches data with a value opposite to that of the previous cycle one. As a result, accurate data can be received. On the other hand, in the non-transition periods of the data, i.e., while no transition pulses are being applied, the data is latched normally in synchronism with the internal clock signal, thus latching accurate data, too.

In addition, according to the present invention, the phase control means can adjust and match the period of the internal clock signal to that of the data. Accordingly, even if a train of the same data value (zeros or ones) appears consecutively (i.e., even while no transition pulses are being applied), the boundary between those data is identifiable accurately. As a result, even such data can be latched correctly and normally responsive to the internal clock signal.

Moreover, according to the present invention, the driver not only outputs the data at regular intervals, but also transmits the periodic clock signal defining the period of the data to the receiver. In response to the periodic clock signal, the receiver generates the internal clock signal. As a result, the period of the data can be accurately matched up to that of the internal clock signal at the receiver. If clock generators are provided for both the driver and receiver alike, then the clock frequencies of these generators should be precisely matched up to each other. In contrast, according to the present invention, such a requirement is no longer imposed. In addition, since there is no need for the receiver to control the phase of the internal clock signal, the configuration of the receiver can be simplified.

Furthermore, where a plurality of transmission lines are provided (i.e., a parallel link is established), the data items are stored in respective FIFO memories by way of the transmission lines. Then, the data items stored on these FIFO memories are sorted out by the sorter based on the reference marks provided from the driver. That is to say, the data items that have been stored on the respective FIFO memories sequentially are sorted out to have the locations of the reference marks aligned among the FIFO memories. In other words, the data items that were output concurrently can be positioned at the same location, thus retaining the data items transmitted through the transmission lines with their correlation corrected. As a result, data can be transmitted in parallel and at high speeds.

DESCRIPTION OF THE PREFERRED EMBODIMENTS

Hereinafter, preferred embodiments of the present invention will be described with reference to the accompanying drawings.

Embodiment 1

Figure 1:
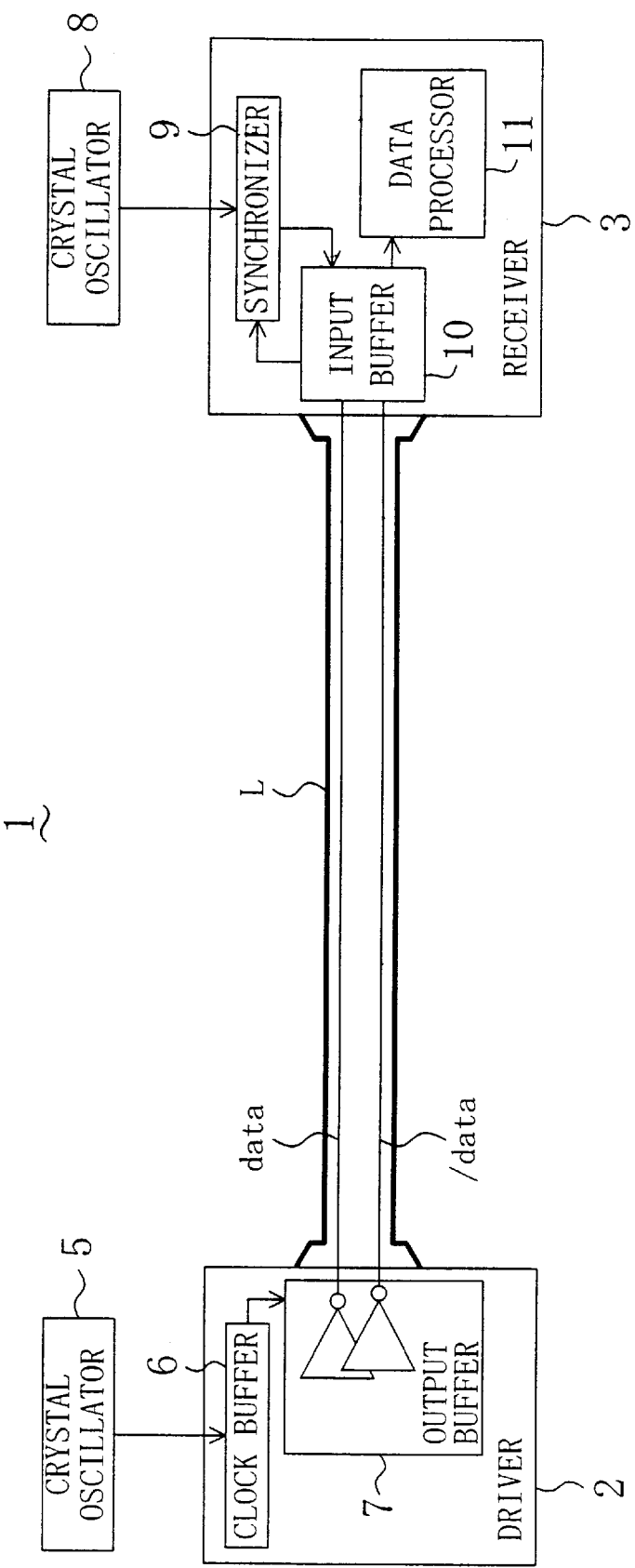
FIG. 1 is a block diagram illustrating an overall arrangement of a data transmitter according to a first embodiment of the present invention.

The data transmitter 1 shown in FIG. 1 includes: a driver 2 for outputting data onto a transmission line L; and a receiver 3 for receiving the data from the driver 2 through the transmission line L. The transmission line L consists of a pair of lines, through which the data is transmitted as differential signals. The differential transmission can advantageously weaken the adverse effects caused when both of these lines L are overlapped with noise in a single phase and can also match the data transmission cycles to each other even if a leading or trailing edge of data on one of these lines has lagged to a certain extent from the associated edge of data on the other line.

The driver 2 is implemented as single LSI. An external clock signal is provided from a crystal oscillator 5 to the driver 2 and then buffered by a clock buffer 6 to generate an internal clock signal. A pair of differential data items are output from an output buffer 7 with reference to each leading edge of the internal clock signal. The transmission line L is implemented as two-conductor cable for transmitting the pair of data items therethrough and is shielded and grounded near the surface thereof.

The receiver 3 is also implemented as single LSI. An external clock signal is provided from another crystal oscillator 8 to the receiver 3, is buffered by a synchronizer 9 and then has its phase controlled to generate an internal clock signal. The crystal oscillator 8 oscillates at the same frequency as the crystal oscillator 5 for the driver 2. The data that has been transmitted through the transmission line L is buffered at an input buffer 10 and processed as valid data at a data processor 11.

Figure 2:
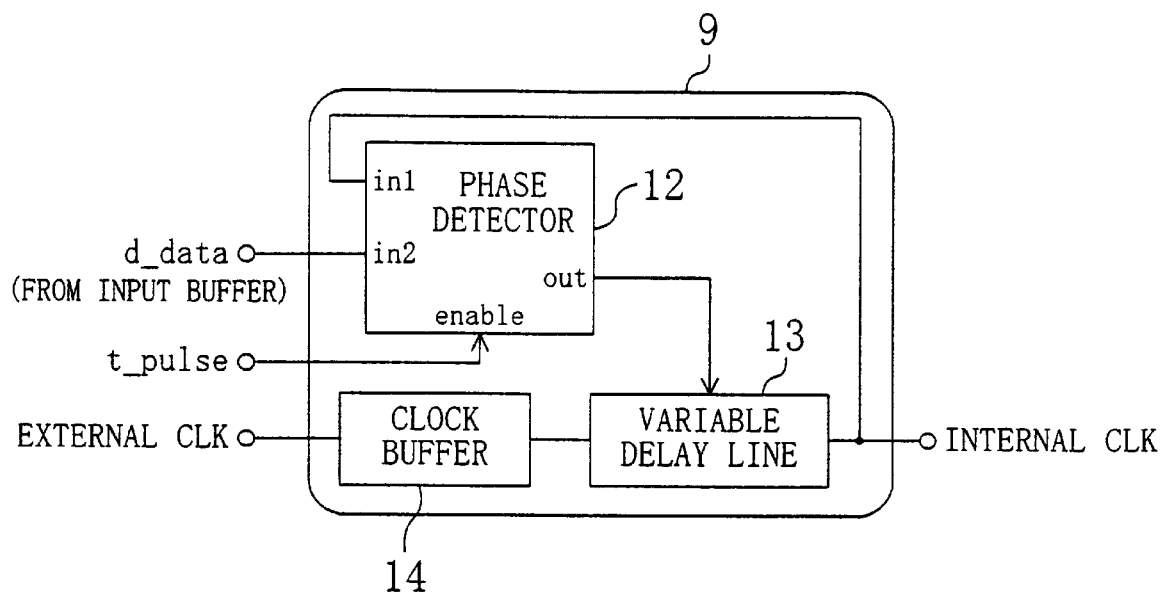
FIG. 2 is a block diagram illustrating an internal configuration of the synchronizer included in the data transmitter.

The synchronizer 9 is equivalent to the phase control means as defined in the appended claims. As shown in FIG. 2, the synchronizer 9 includes phase detector 12 and variable delay line 13. The phase detector 12 compares the phase of data d_data provided from the input buffer 10 to that of the internal clock signal. The delayed caused by the variable delay line 13 is controllable by the phase detector 12. Responsive to a transition pulse t_pulse applied from a pulse generator PG within the input buffer 10, the phase detector 12 is enabled. The external clock signal received at a clock buffer 14 has its phase controlled through the variable delay line 13 to generate the internal clock signal with a phase locked to that of the data that has been output from the driver 2.

Figure 3:
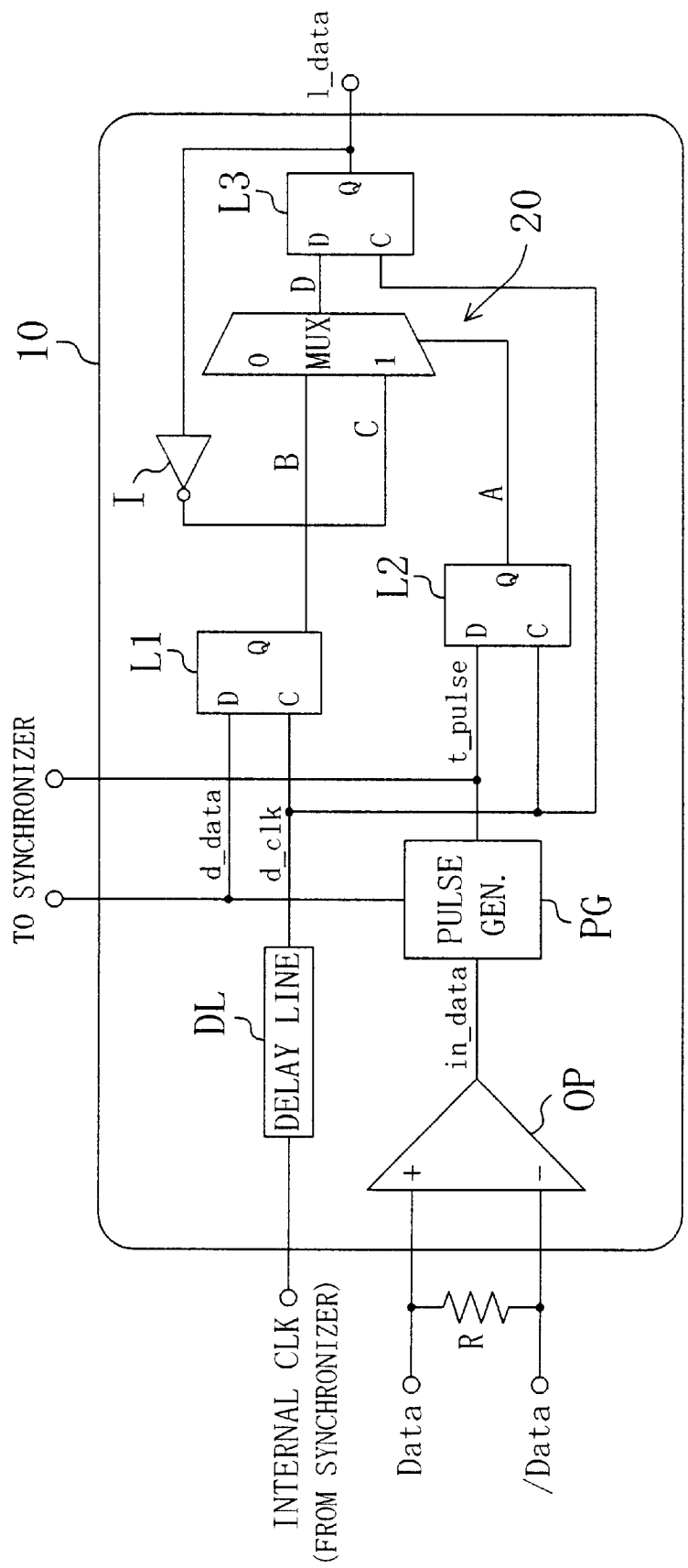
FIG. 3 is a circuit diagram illustrating an internal configuration of the input buffer included in the data transmitter.

As shown in FIG. 3, the input buffer 10 includes: a differential amplifier OP for receiving a pair of differential data items Data and/Data by way of a terminal resistor R; and the pulse generator PG, to which digital data in_data is input from the differential amplifier OP.

Figure 4A:
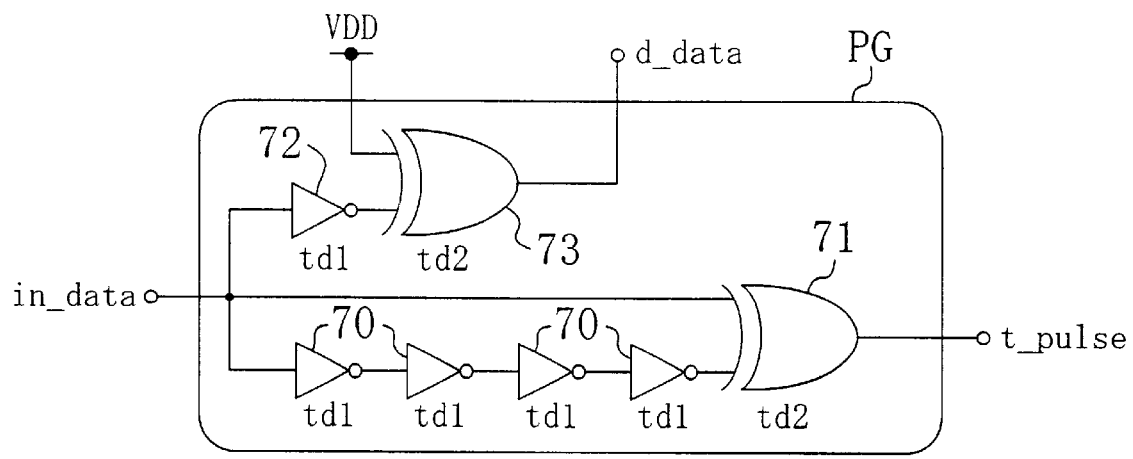
FIG. 4(a) is a circuit diagram illustrating an internal configuration of the pulse generator included in the data transmitter.
Figure 4B:
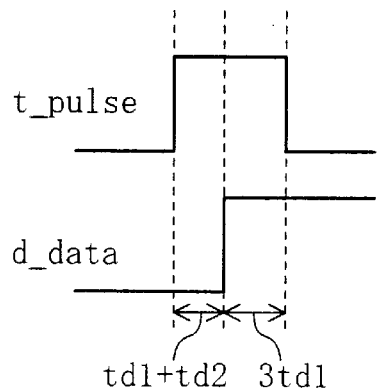
FIG. 4(b) illustrates a phase relation between delayed pulse and delayed data.

The pulse generator PG is equivalent to the transition pulse generator as defined in the appended claims. As shown in FIG. 4(a), the pulse generator PG generates the transition pulse t_pulse with a predetermined width of (4td1+td2) from the input data in_data by getting the data in_data delayed by four stages of inverters 70, each causing a gate delay of td1, and an exclusive-OR gate 71 causing a gate delay of td2. The input data in_data is also delayed by another inverter 72 and another exclusive-OR gate 73 of the same sizes to generate data d_data, to which a predetermined delay (td1+td2) has been added. Each of the delay devices defining the pulse width (i.e., the four stages of inverters 70 and the exclusive-OR gate 71) has totally the same configuration as the counterpart of the delay devices defining the delay of the data (i.e., the inverter 72 and the exclusive-OR gate 73). And the delay devices of these two groups are disposed in close proximity to each other. Accordingly, even if the absolute values of the delays td1 and td2 have changed due to some variations involved with a semiconductor device fabrication process, the correlation shown in FIG. 4(b) between the transition pulse t_pulse and the data t_data remains the same. Specifically, a leading edge of the transition pulse t_pulse comes first, the data d_data changes its level and then the transition pulse t_pulse falls. Thus, each and every transition of the data d_data overlaps with the associated transition pulse t_pulse. That is to say, by using the transition pulse t_pulse, it is possible to prevent the data d_data in transition from being latched in synchronism with the clock signal.

Next, it will be described with reference to FIG. 5 how to control the latching timing of the data by using the transition pulse t_pulse overlapping with the transition of the data.

Figure 5:
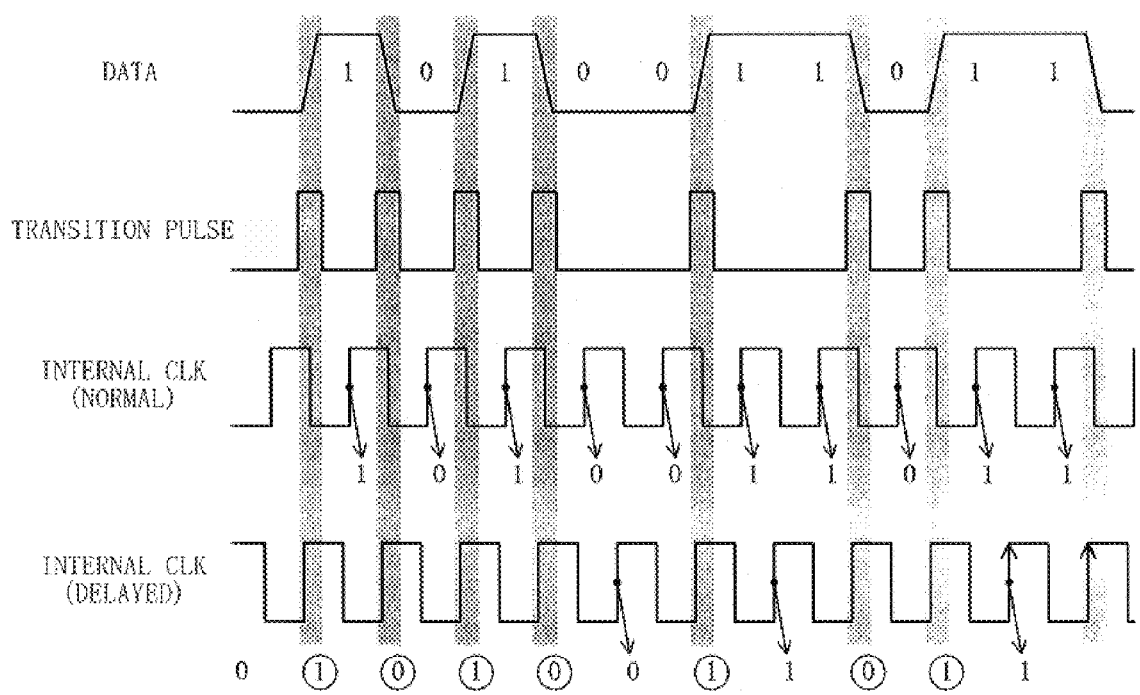
FIG. 5 illustrates a basic operating concept of the data transmitter.

As shown in FIG. 5, whenever the data changes its level, an associated transition pulse is generated so as to overlap with the data transition. In a normal situation where no leading edges of the internal clock signal overlap with the transition pulses, the data is latched in synchronism with the leading edges of the internal clock signal while the level of the data is fixed (flat portions of the waveform). Thus, accurate data can be latched with reliability.

On the other hand, where the leading edges of the internal clock signal overlap with the transition pulses as illustrated in the lowermost waveform in FIG. 5, the data is not latched in synchronism with the leading edges of the internal clock signal. Instead, a data value opposite to the previous cycle one is latched as represented by the encircled digits in FIG. 5. That is to say, while the data is changing its level, the data is not latched to avoid erroneous latching. As described above, the transition of the data means that a data value opposite to the previous-cycle one has been transmitted. Thus, if the data opposite to the previous cycle one is received every time in such a situation, then accurate data can be received.

An exemplary circuit for carrying out this operation will be described as the input buffer 10 shown in FIG. 3. To latch the data d_data provided from the pulse generator PG, the internal clock signal is delayed through a delay line DL for the same amount of time (td1+td2) as that of the data d_data. The delayed clock signal (which will be called a latched clock signal d_clk) is input to an edge-triggered D latch L1. The transition pulse t_pulse is also provided from the pulse generator PG to a data input terminal D of another D latch L2, which determines whether or not the leading edge of the latched clock signal d_clk overlaps with the transition interval of the data d_data. Specifically, if the output of the D latch L2 at a node A is high, then the overlap is affirmed. Alternatively, if the output at the node A is low, then the overlap is negated. And if the output A of the D latch L2 is high, then a multiplexer MUX selects an inverted data value (at a node C) obtained by getting the previous cycle one inverted by an inverter I and a D latch L3 retains the data value as fixed data. Conversely, if the output A of the D latch L2 is low, then the multiplexer MUX selects a non-inverted data value (at a node B) that has been latched by the D latch L1 normally and the D latch L3 retains the data value as fixed data. The D latches L2 and L3, inverter I and multiplexer MUX together constitute a data latching circuit 20.

Figure 6:
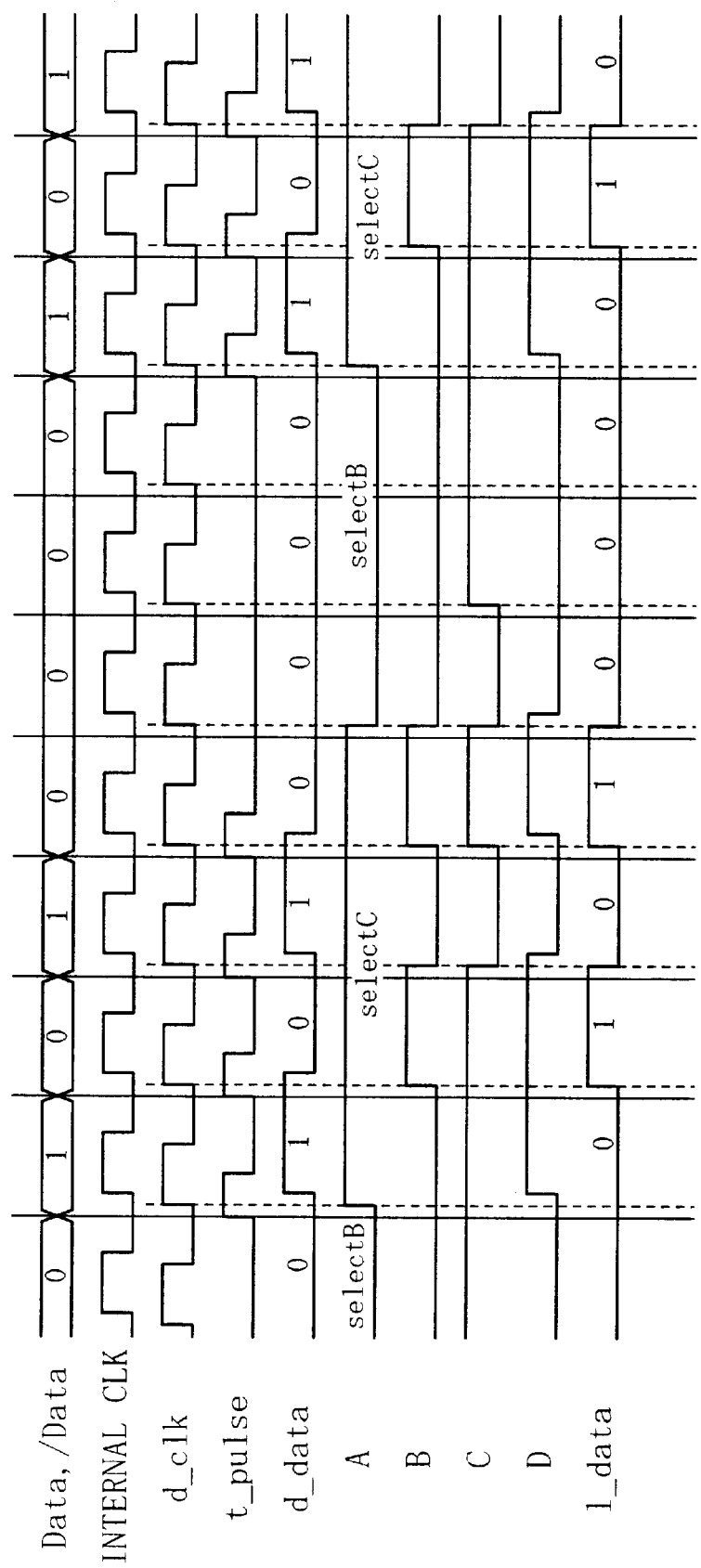
FIG. 6 is a timing diagram illustrating a situation where leading edges of the internal clock signal do overlap with the transition pulses in the input buffer included in the data transmitter.
Figure 7:
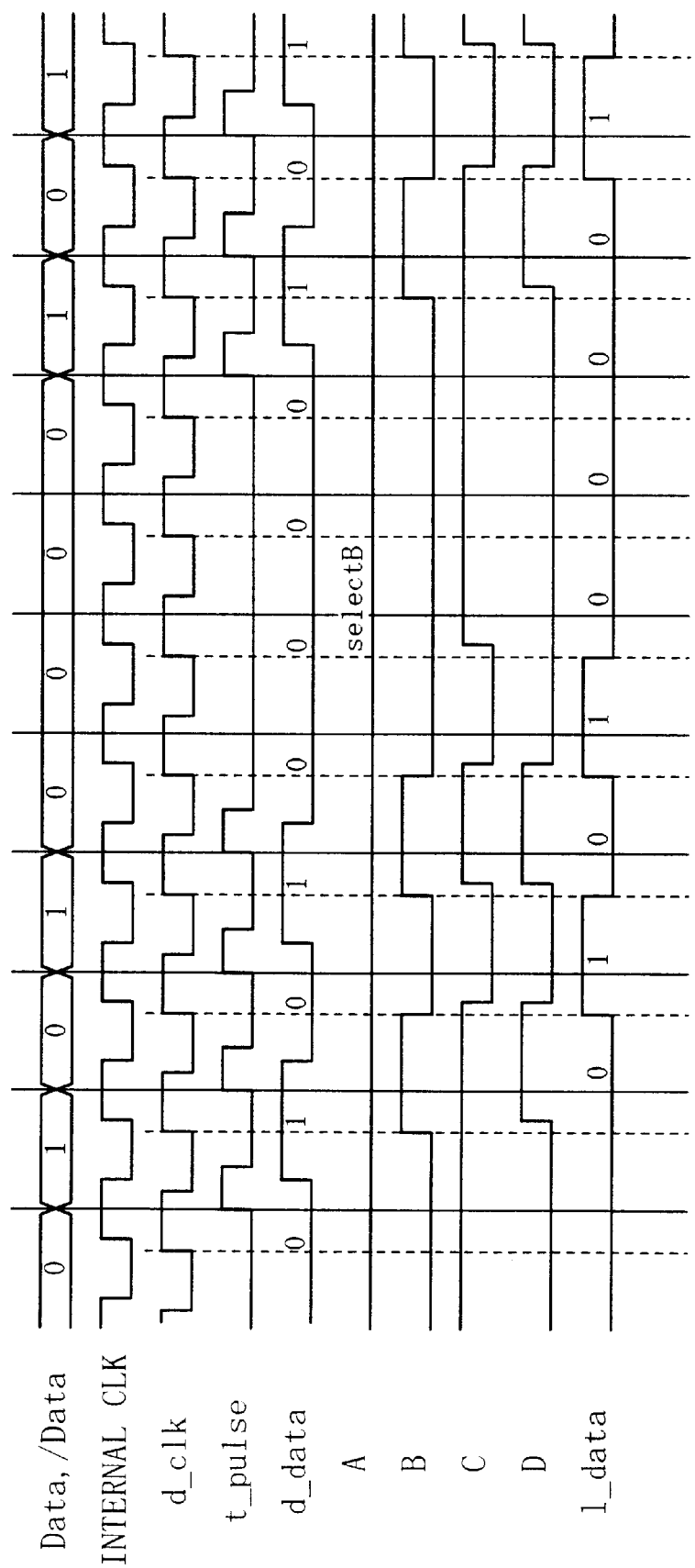
FIG. 7 is a timing diagram illustrating a normal situation where leading edges of the internal clock signal do not overlap with the transition pulses in the input buffer included in the data transmitter.

FIG. 6 illustrates a situation where the latched clock signal d_clk has delayed and the leading edges thereof overlap with the transition pulses t_pulse. On the other hand, FIG. 7 illustrates a situation where the latched clock signal d_clk has had its phase controlled at the normal one and the leading edges thereof do not overlap with the transition pulses t_pulse. As can be seen from FIG. 6, even if the latched clock signal d_clk has delayed, no transition pulses t_pulse are generated where there are no data transitions. Accordingly, the data that has been latched in synchronism with the latched clock signal d_clk is adopted. That is to say, even a train of the same data value can have its boundary identified based on the latched clock signal. As a result, accurate data can be received.

In this manner, if the same data value appears consecutively, that type of data is received by reference to the internal clock signal (i.e., the latched clock signal d_clk). Thus, the period of the internal clock signal plays a key role in such a situation. Accordingly, high frequency precision is required for the two crystal oscillators 5 and 8 shown in FIG. 1.

Embodiment 2

Figure 8:
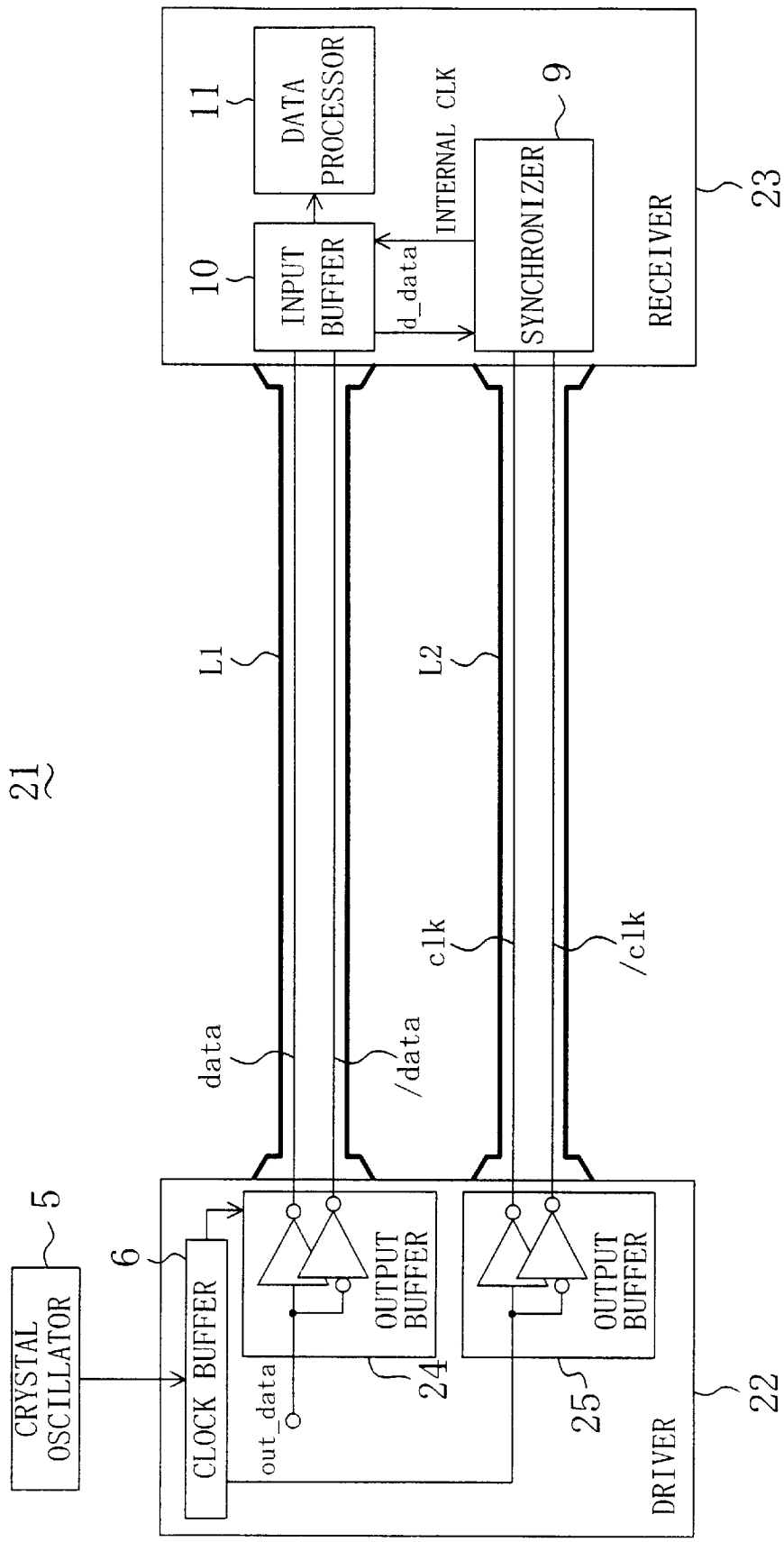
FIG. 8 is a block diagram illustrating an overall arrangement of a data transmitter according to a second embodiment of the present invention.

FIG. 8 illustrates a second exemplary embodiment of the present invention. This embodiment is adapted to relax the high frequency precision requirement imposed on the crystal oscillators 5 and 8.

In the data transmitter 21 shown in FIG. 8, the driver 22 includes not only the data output buffer 24, but also another output buffer 25 for transmitting periodic clock signals clk and/clk defining the period of the data. The output buffer 25 is equivalent to the clock signal transmitter as defined in the appended claims. Also, another differential transmission line L2 is provided for transmitting the clock signals clk and/clk therethrough in addition to the data transmission line L1. And responsive to the clock signals clk and/clk, the synchronizer 9 generates the internal clock signal at the receiver 23. The synchronizer 9 is equivalent to the internal clock generator as defined in the appended claims.

Thus, although the number of transmission line cables should be increased according to this embodiment, the clock signals clk and/clk actually defining the data period at the driver 22 are input to the receiver 23. Accordingly, there is no need to pay so much attention to the precision of the crystal oscillators for generating the external clock signals defining the data periods. This would be particularly convenient if the driver 22 and receiver 23 were made by different makers.

Embodiment 3

Next, a third exemplary embodiment of the present invention will be described.

Figure 9:
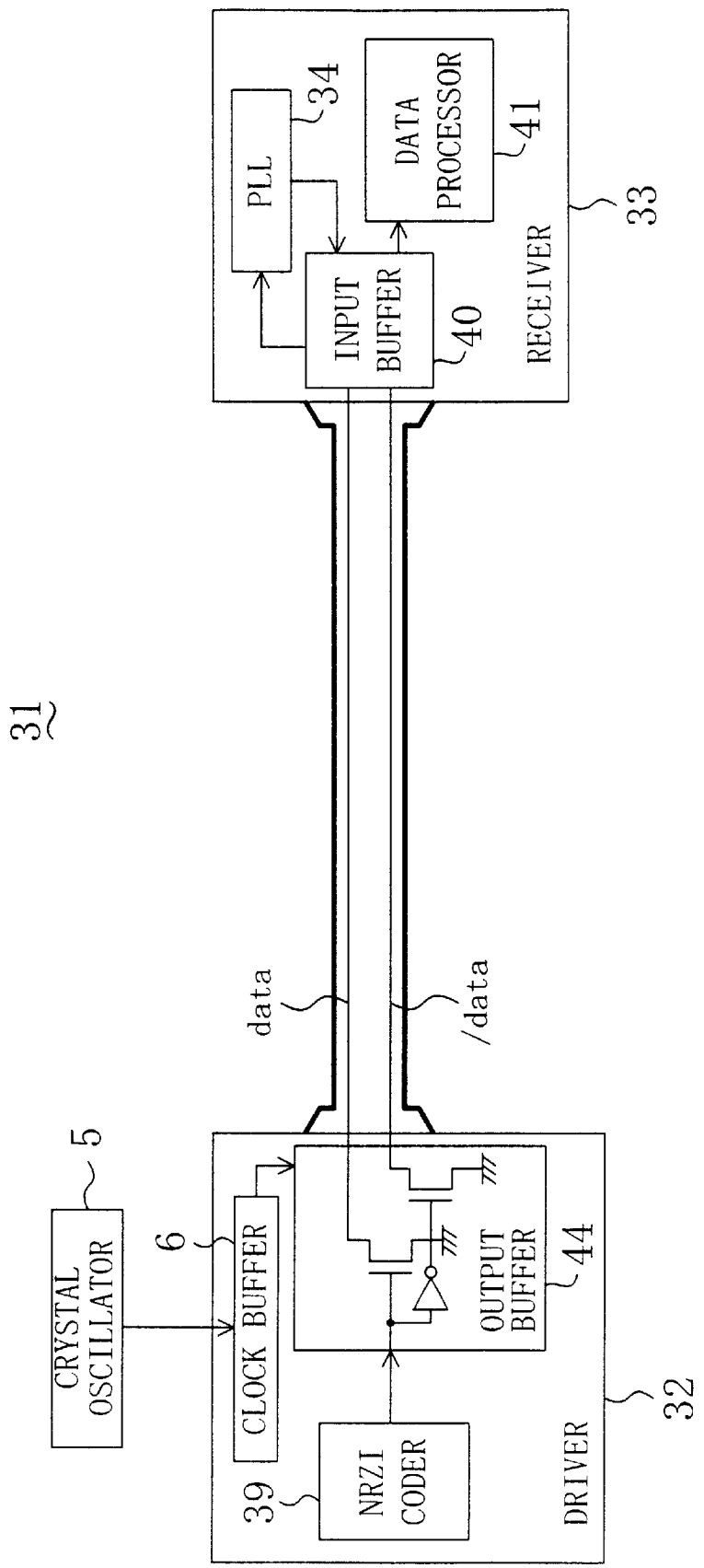
FIG. 9 is a block diagram illustrating an overall arrangement of a data transmitter according to a third embodiment of the present invention.

In the data transmitter 31 shown in FIG. 9, the receiver 33 does not generate the internal clock signal responsive to the external clock signal. Instead, a PLL circuit 34 included as another phase control means in the receiver 33 generates an internal clock signal with a period matched up to that of the data transmitted from the driver 32. Accordingly, data can be transmitted at high speeds with the internal clock signal generated in synchronism with the data and with the cable for the external clock signal and the crystal oscillator eliminated from the receiver 33.

Figure 10:
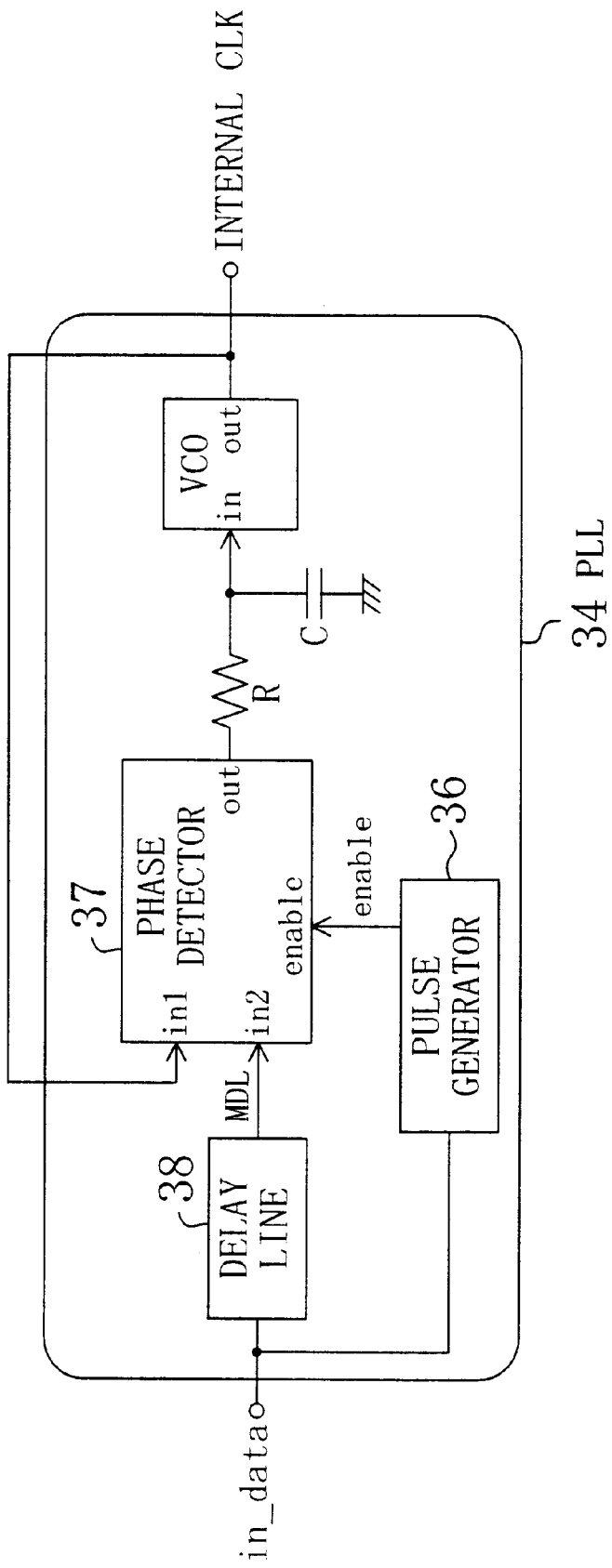
FIG. 10 is a block diagram illustrating a PLL circuit included in the data transmitter.
Figure 11:
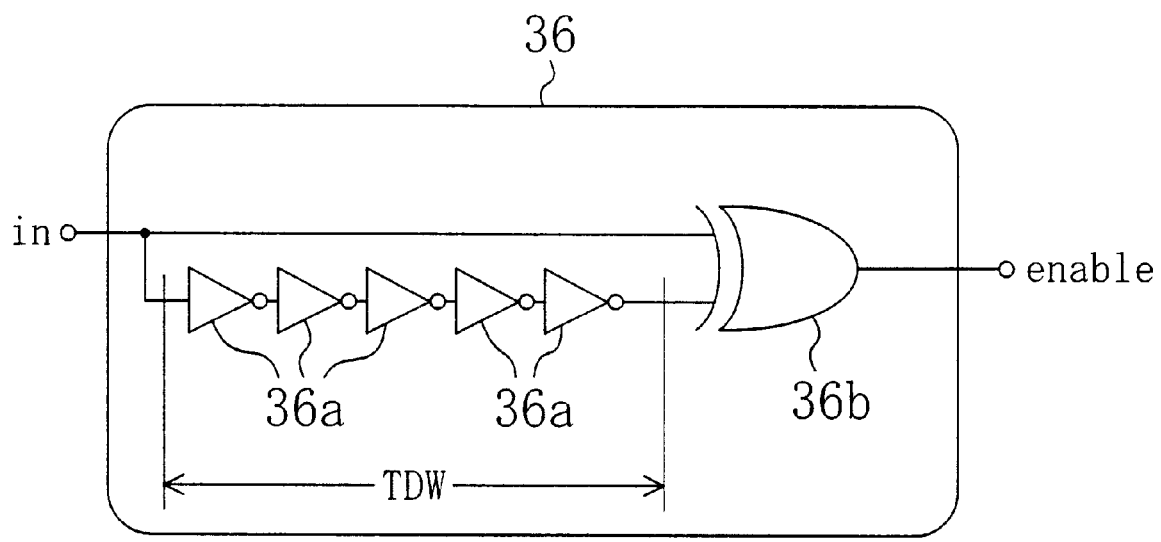
FIG. 11 is a circuit diagram illustrating a pulse generator included in the PLL circuit.
Figure 12:
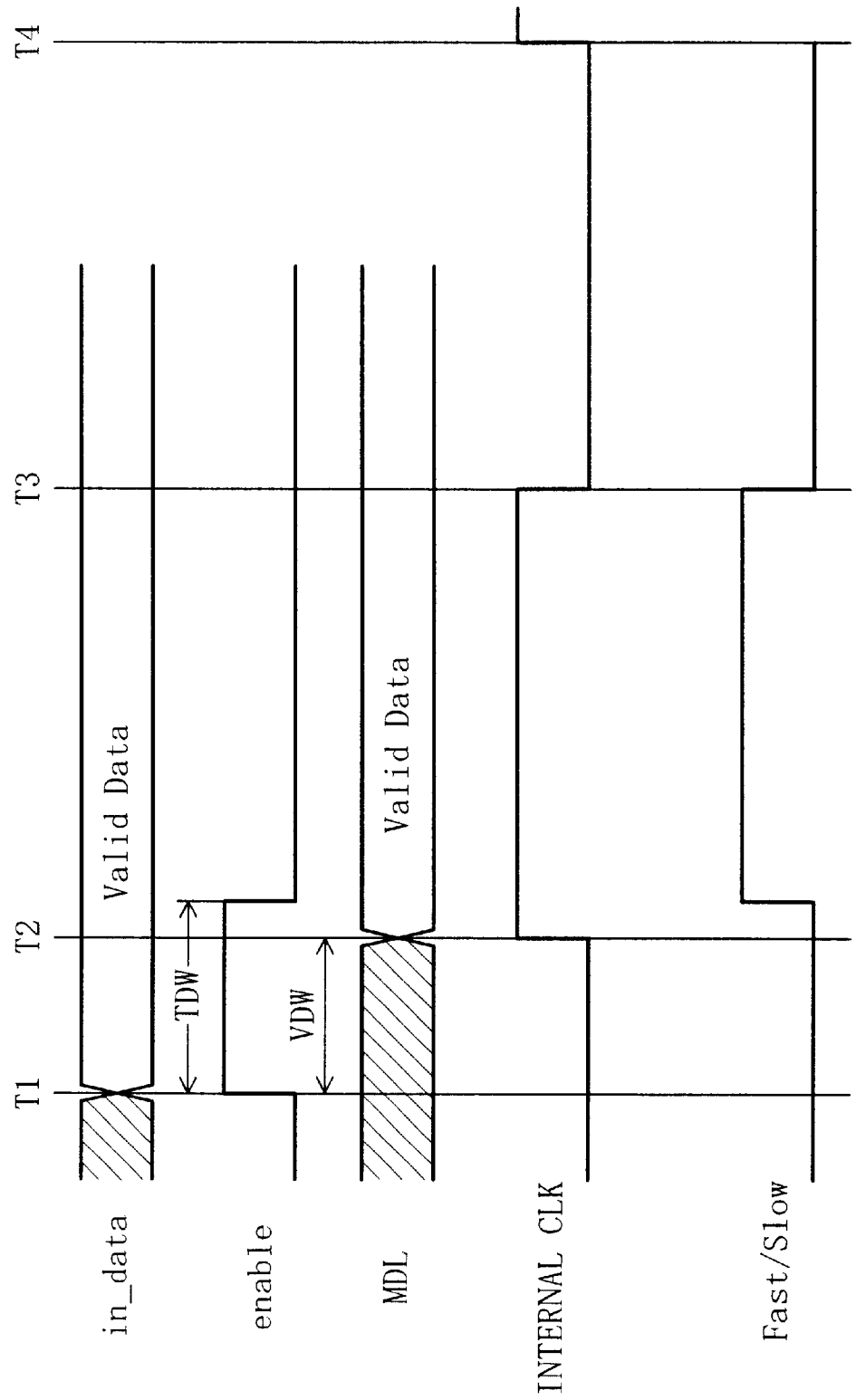
FIG. 12 illustrates a basic operating concept of the PLL circuit.

FIG. 10 illustrates the PLL circuit 34 included in the data transmitter 31. Considering that the data might change its level irregularly (i.e., zeros or ones appear sometimes consecutively and sometimes alternately), the PLL circuit 34 performs phase comparison only when there is data transition. As shown in FIG. 10, the PLL circuit 34 includes a pulse generator 36. The pulse generator 36 includes multiple (five in the illustrated embodiment) inverters 36a and one exclusive-OR gate 36b as shown in FIG. 11. The pulse generator 36 generates an enable pulse enable with a predetermined width TDW at the transition edge of the data, thereby activating a phase detector 37. The input data in_data is delayed through a delay line 38 for a predetermined time VDW. The phase detector 37, which has been activated responsive to the enable pulse enable, compares an edge of the data MDL, which is obtained by delaying the input data in_data, to an associated edge of the internal clock signal as shown in FIG. 12. Based on the result of this comparison, the phase detector 37 regulates a potential applied to a voltage-controlled oscillator VCO included in the PLL circuit 34, thereby generating an internal clock signal with a frequency precisely matched up to that of the data.

Figure 13:
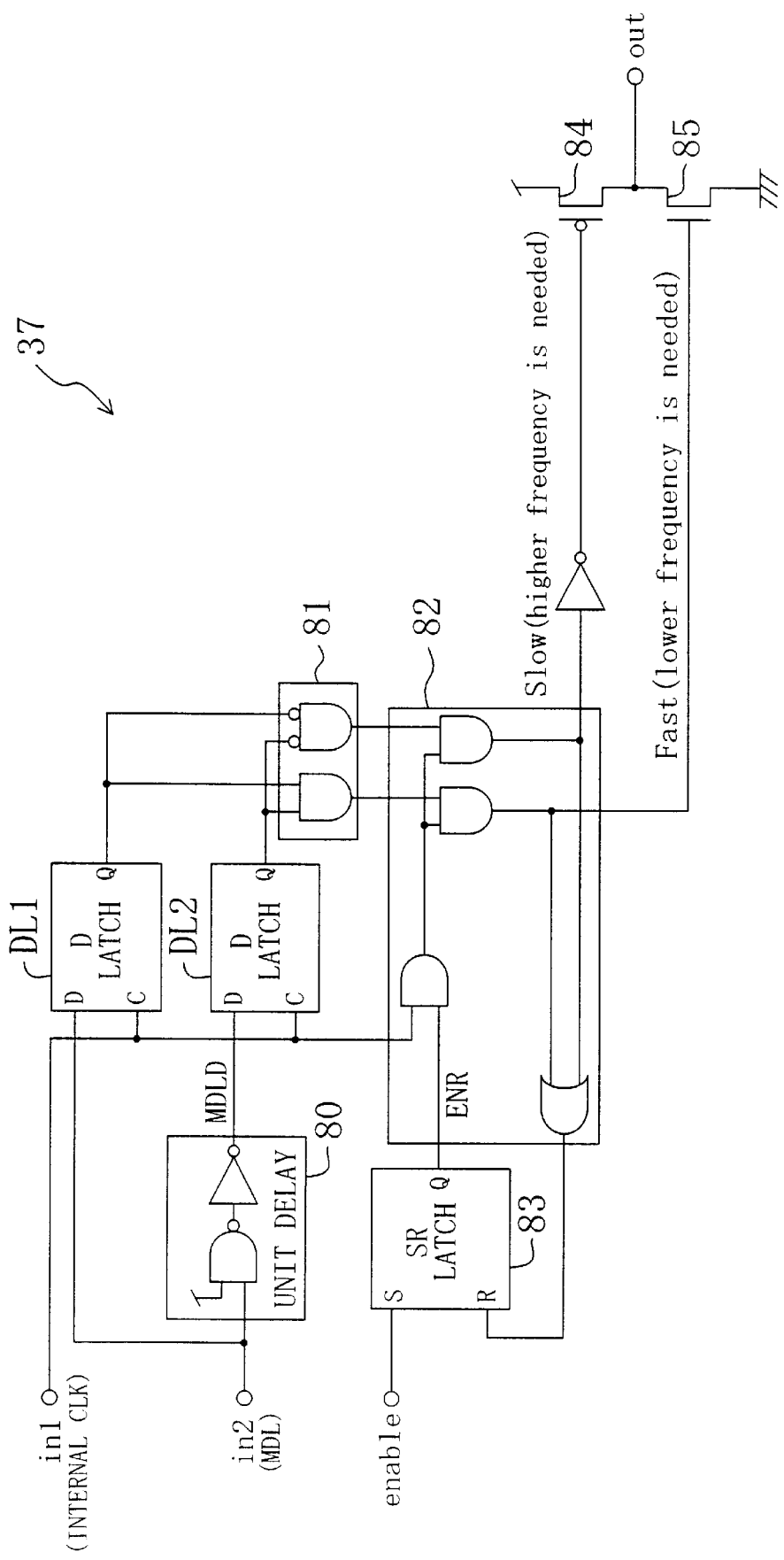
FIG. 13 is a circuit diagram illustrating a phase detector included in the PLL circuit.
Figure 14:
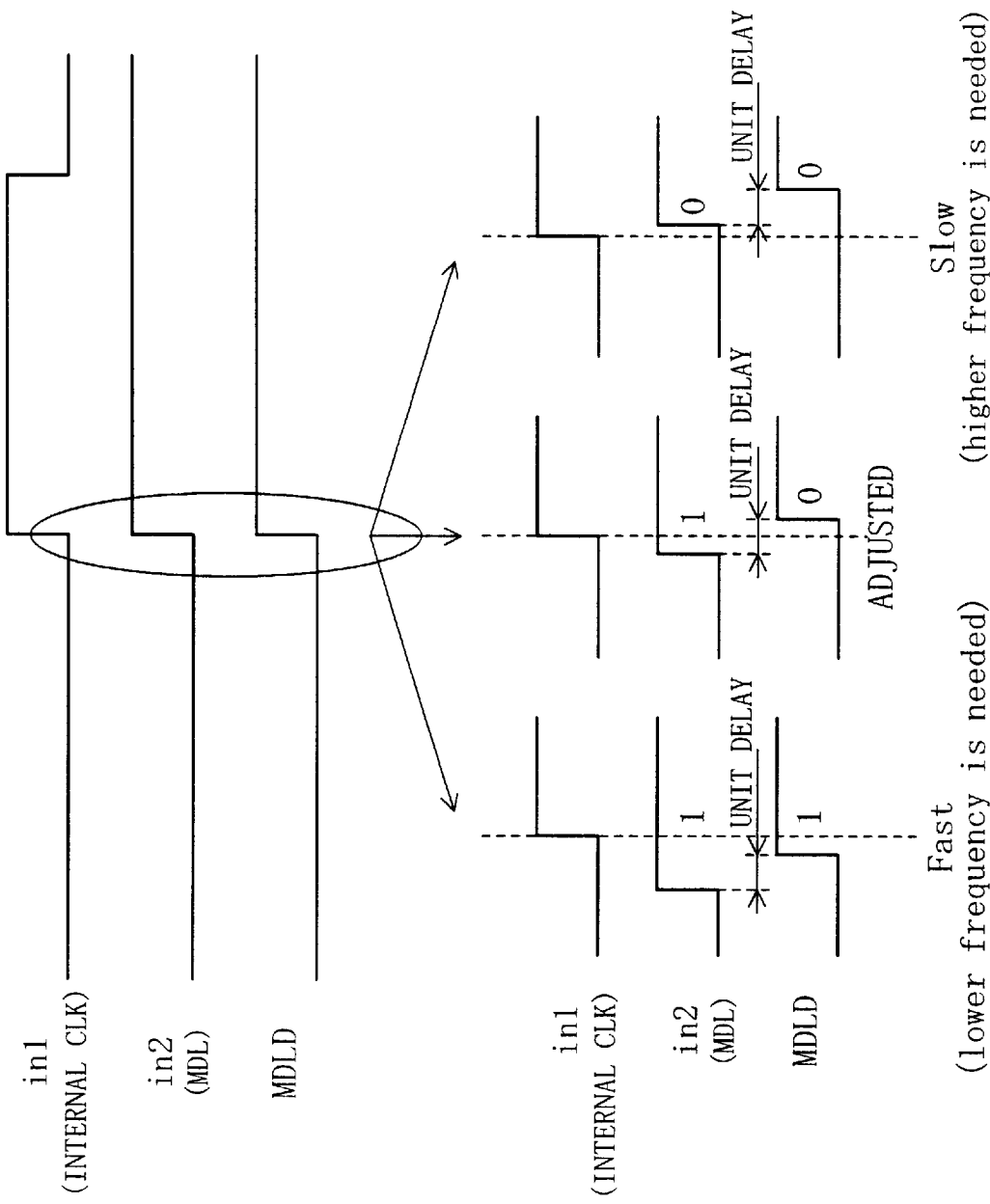
FIG. 14 illustrates a basic operating concept of the phase detector.

As shown in FIG. 13, the phase detector 37 gets the delayed input data MDL further delayed by a delay circuit 80 for a unit time, thereby producing unit delayed data MDLD. The states of the unit delayed data MDLD and the input data MDL that are associated with a leading edge of the internal clock signal are retained in D latches DL2 and DL1, respectively. Then, a comparator 81 compares the phases of the internal clock signal and the delayeddata MDL and MDLD to each other as shown in FIG. 14. Specifically, if the data MDL and the unit delayed data MDLD are both one on a leading edge of the internal clock signal, then the frequency of the VCO should be decreased because the internal clock signal is in advance of the delayed data. Alternatively, if the data MDL and the unit delayed data MDLD are both zero on a leading edge of the internal clock signal, then the frequency of the VCO should be increased because the internal clock signal is trailing behind the delayed data. A signal representing the result of this comparison is input to an output controller 82. In a cycle during which the enable pulse enable is being output, the output ENR of an SR latch 83 is one. In response, the output controller 82 outputs a control signal Fast or Slow to a PMOS or NMOS transistor 84 or 85, thereby regulating the voltage applied to the VCO.

Figure 15:
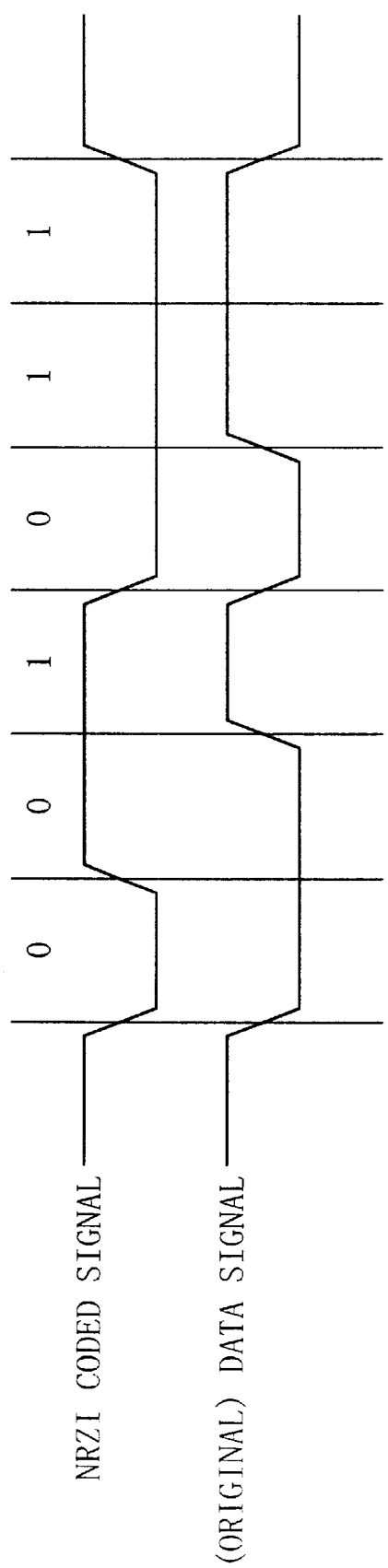
FIG. 15 illustrates a concept of NRZI coding.

In the data transmitter 31 according to the third embodiment, the internal clock signal is generated within the receiver 33. Accordingly, the data is supposed to change its level to track the frequency of the internal clock signal. However, zeros or ones might appear consecutively as data values for a long time. Thus, the driver 33 includes an NRZI (nonreturn-to-zero inverting) coder 39 in the data transmitter 31 as shown in FIG. 9. The NRZI coding technique will be briefly described. As shown in FIG. 15, the NRZI coded signal does not change its level while the data is one, but does change its level while the data is zero. In the idling state, the NRZI coded signal is supposed to be one. For example, if the data changes its levels as 0, 1, 0, 0, 0 and 1, then the levels of the NRZI coded signal are 0, 0, 1, 0, 1 and 1. That is to say, even if zeros appear consecutively as data values, the NRZI coded signal changes its level every time. On the other hand, if ones appear consecutively as data values, the NRZI coded signal does not change its level at all. In actual data transmission, zeros appear consecutively quite a few times, but ones rarely appear back to back. Thus, according to the NRZI coding technique, it would be much easier for the PLL circuit 34 to attain phase locking even if zeros appear one after another. In other words, the frequency of the internal clock signal at the receiver 33 can be matched up to that of the data, thus ensuring more accurate data reception.

Embodiment 4

Next, a fourth exemplary embodiment of the present invention will be described.

Figure 16:
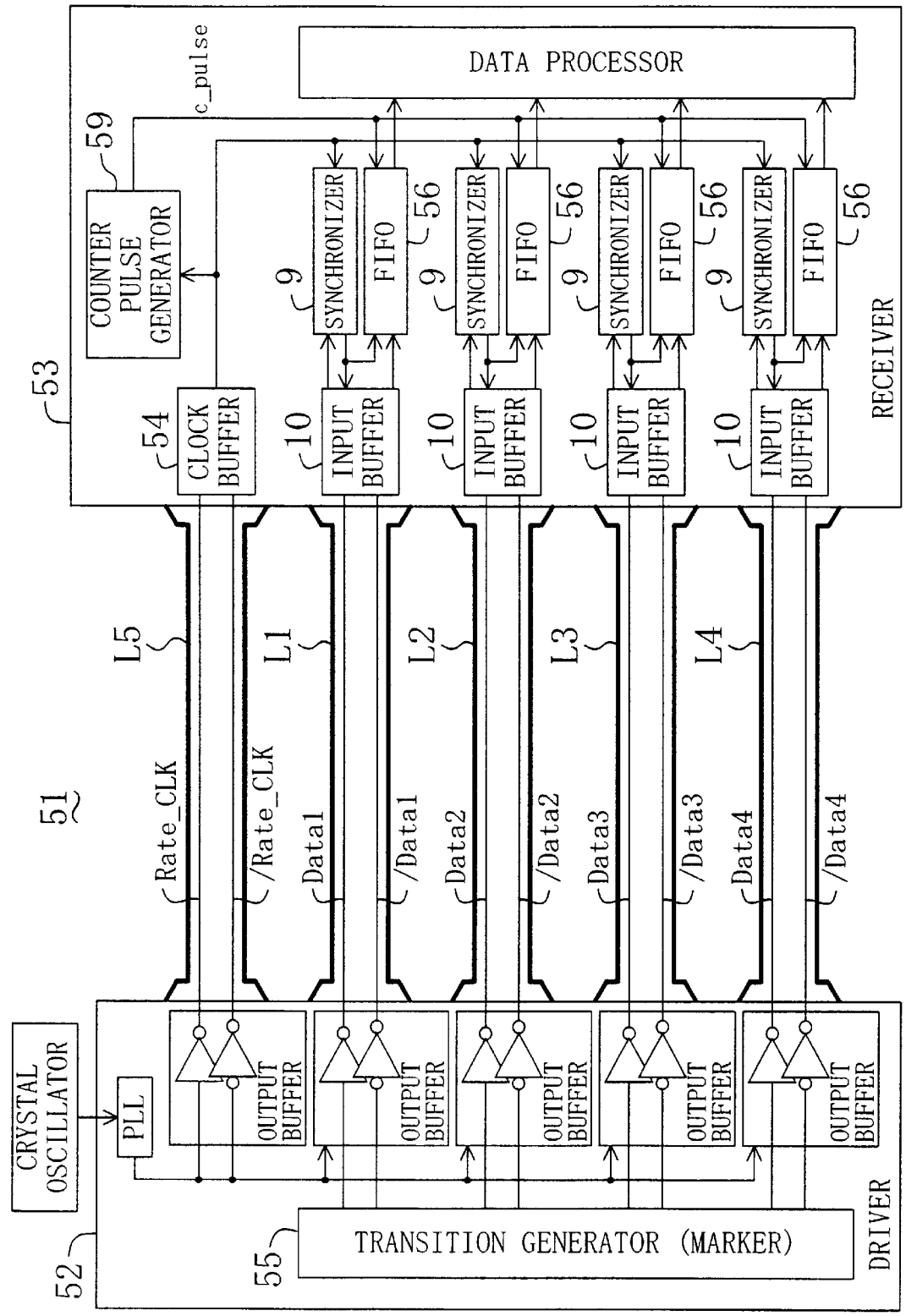
FIG. 16 is a block diagram illustrating an overall arrangement of a data transmitter according to a fourth embodiment of the present invention.

The data receiver 51 shown in FIG. 16 includes four transmission lines L1 through L4 for outputting data items therethrough and one more transmission line L5. Clock signals Rate_CLK and/Rate_CLK defining the period of the data are output from a driver 52 to a receiver 53 through the transmission line L5. These clock signals Rate_CLK and/Rate_CLK are buffered by a clock buffer 54 included in the receiver 53 and then distributed to synchronizers 9, which are provided for respective input buffers 10 associated with those data items that have been transmitted through the transmission lines L1 through L4. Each of these synchronizers 9 generates an internal clock signal to latch the associated data item. And this internal clock signal is used for receiving the data item at the corresponding input buffer 10.

The driver 52 further includes a transition generator 55 for making each data item change its level from zero to one compulsorily every 32 cycles. This transition represents two reference bits needed for synchronizing the data items Data1 through Data4 with each other. That is to say, by making all of these data items Data1 through Data4 change their levels in the same way every 32 cycles, data items that were output simultaneously are identifiable. Accordingly, the transition generator 55 functions as marker for adding the reference bits.

Figure 17A:
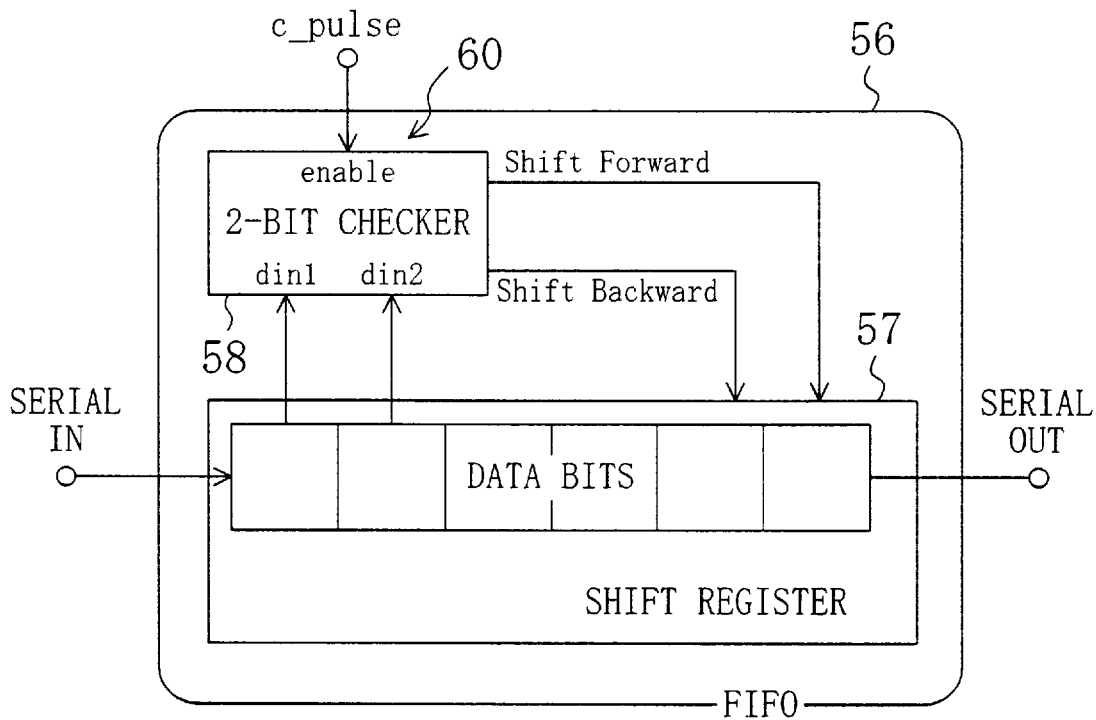
FIG. 17(a) is a block diagram illustrating an FIFO memory included in the data transmitter.

These reference bits are used by FIFO memories 56 in the receiver 53 for retaining these data items sequentially and then sorting out the data items that have been stored thereon. As shown in FIG. 17(a), each FIFO memory 56 includes: a shift register 57 for sequentially storing the data items provided from the associated input buffer 10; and a 2-bit checker 58 for checking the foremost 2 reference bits. The 2-bit checker 58 receives an enable pulse c_pulse from a counter pulse generator 59 for generating a pulse with a width of 2 cycles every time 32 cycles has passed by counting internal clock pulses provided from the clock buffer 54 as shown in FIG. 16. Responsive to this enable pulse c_pulse, the 2-bit checker 58 checks the values of the foremost two bits stored on the shift register 57.

Figure 17B:
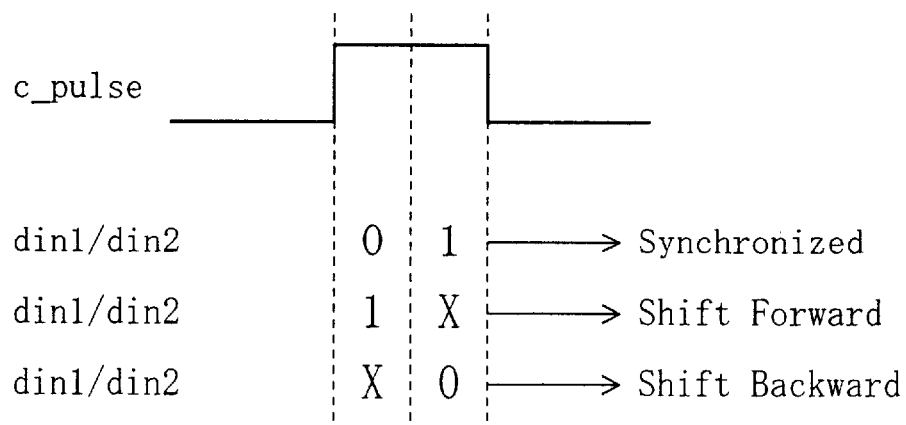
FIG. 17(b) illustrates decision results obtained by a 2-bit checker.

In the data transmitter 51, the application of the enable pulse c_pulse is timed during setup such that the foremost two bits in the shift register 57 match up to the reference bits exactly when the enable pulse c_pulse reaches the FIFO 56. And when the setup is over, these two bits are set at 0 and 1 (synchronized) in all the FIFO memories 56 as shown in FIG. 17(b). In an actual operation, the 2-bit checker 58 performs the decision just in response to the enable pulse c_pulse. If these two bits are found 1 and X (where X is 0 or 1), then the data stored in the shift register 57 is shifted forward by one bit because the data is trailing by one bit. Alternatively, if these two bits are found X and 0 (where X is 0 or 1) and 0, then the data stored in the shift register 57 is shifted backward by one bit because the data is leading by one bit. The counter pulse generator 59 shown in FIG. 16 and the 2-bit checker 58 shown in FIG. 17 together constitute a sorter 60.

In this manner, the data transmitter 51 synchronizes multiple data items with each other based on the reference bits and corrects the correlation among the respective data items received (i.e., the identity as data items that were output concurrently), thereby realizing high-speed parallel data transmission. It is noted that each data item can be received accurately in accordance with the serial transmission technique.

As is apparent from the foregoing description, the data transmitter according to the present invention can receive and recover transmitted data accurately at the receiver based on the transition pulses representing data transitions, thus realizing high-speed data transmission.

What is claimed is:

1. A data transmitter comprising:
    a driver for outputting digital data onto a transmission line; and
    a receiver for latching the data, which has been output on the transmission line, in synchronism with an edge of an internal clock signal,
    wherein the receiver includes:
        a transition pulse generator for generating transition pulses, each representing a transition of the data that has been output on the transmission line; and
        a data latching circuit for latching data with a value opposite to that of another data that has been output on the transmission line during a previous cycle if any edge of the internal clock signal at the receiver overlaps with associated one of the transition pulses.

2. The data transmitter of claim 1, wherein the receiver comprises means for controlling the phase of the internal clock signal, the phase control means adjusting the period of the internal clock signal by comparing an edge of the data that has been output onto the transmission line to an associated edge of the internal clock signal.

3. The data transmitter of claim 2, wherein the phase control means operates while each said transition pulse is being applied from the transition pulse generator.

4. The data transmitter of claim 1, wherein the driver comprises a clock signal transmitter for transmitting a periodic clock signal defining the period of the data that will be output onto the transmission line, and
    wherein the receiver comprises an internal clock generator for generating the internal clock signal at the receiver responsive to the periodic clock signal received from the clock signal transmitter.

5. The data transmitter of one of claims 1 to 4, further comprising additional transmission lines,
    wherein the driver includes a marker for placing a reference mark at an appropriate location of each of a series of data items that will be output onto the transmission lines, and
    wherein the receiver includes:
        a plurality of FIFO memories for storing the series of data items that have been output on the transmission lines; and
        a sorter for receiving the reference marks from the marker and sorting out the series of data items that have been received at the FIFO memories based on the reference marks.

* * * * *